United States Patent [19]

Clanin

[11] Patent Number: 5,493,917
[45] Date of Patent: Feb. 27, 1996

[54] METER READING

[76] Inventor: William B. Clanin, P.O. Box 25762, Fresno, Calif. 93729

[21] Appl. No.: 277,174

[22] Filed: Jul. 18, 1994

[51] Int. Cl.⁶ ............................................... G01F 1/075
[52] U.S. Cl. .................................................. 73/861.77
[58] Field of Search ........................ 73/861.42, 258, 73/861.77

[56] References Cited

U.S. PATENT DOCUMENTS 4,569,233  2/1986  Rosaen ............................. 73/861.42
4,872,352  10/1989  Alden et al. ..................... 73/861.77
5,261,275  11/1993  Davis ................................. 73/258

*Primary Examiner*—Richard Chilcot
*Assistant Examiner*—Jewel V. Artis
*Attorney, Agent, or Firm*—Fish & Richardson

[57] ABSTRACT

A meter is retrofitted for remote operation by replacing the lens with a replacement lens having a pickup transducer seated only in the replacement lens free of the meter casing.

14 Claims, 4 Drawing Sheets

METER READING

The present invention relates in general to meter reading and more particularly concerns novel methods and apparatus for retrofitting water meters with a pickup for remote reading.

One prior art approach for retrofitting a water meter for remote-pickup involves replacing the presently-installed water meter with a new water meter that has remote pickup capability built-in.

A second approach involves removing the meter and returning it to a factory for a retrofit.

According to the invention, the lens on a presently-installed meter is removed while the meter remains operatively connected to the circuit carrying the stream being measured in the flow path to which the meter is connected and measuring the flow. The meter can be retrofitted for remote-pickup quickly and replaced by a meter lens having a pickup transducer seated only in the replacement lens free of the meter casing.

The replaceable lens has top and bottom surfaces with a circumferential edge therebetween and is typically formed with a passage having an inside portion between the top and bottom surfaces contiguous with an end portion generally perpendicular to the inside portion and the top and bottom surfaces with an opening in the top surface for accommodating a pickup transducer and signal leads connected to the pickup transducer. The pickup transducer is typically seated in the inside portion of the passage with the signal leads passing through the end portion and the opening.

According to a specific form of the invention with a meter having a rotating pointer, a signaller such as a permanent magnet is attached to the pointer, and the pickup transducer is responsive to the signaller to provide a revolution signal each time the signaller passes, typically operating a magnetic reed switch comprising the pickup transducer once per revolution.

Other features and advantages of the invention will become apparent from the following detailed description when read in connection with the accompanying drawings in which.

Figure 1:
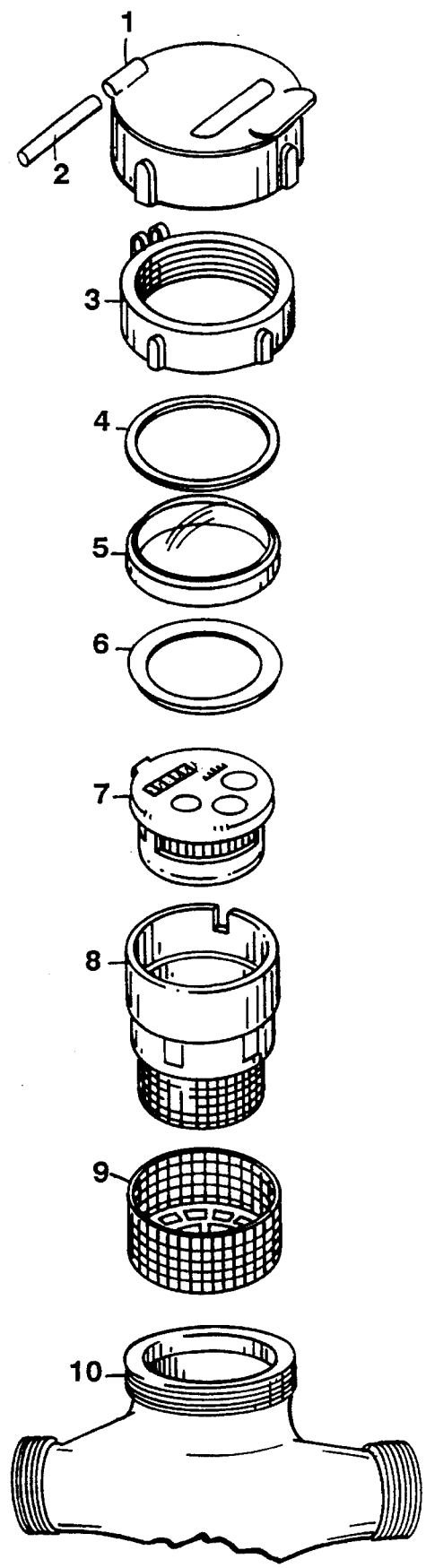
FIG. 1 is an exploded view of a typical water meter.

With reference now to the drawings, and more particularly to FIG. 1 thereof, there is shown an exploded view of a typical prior art water meter. The meter comprises a brass or plastic lid 1, a hinge pin 2, a retaining ring 3, a slip ring 4, a lens 5, a top seal 6, a register 7, a chamber assembly 8, a strainer 9 and a housing 10.

Figure 2:
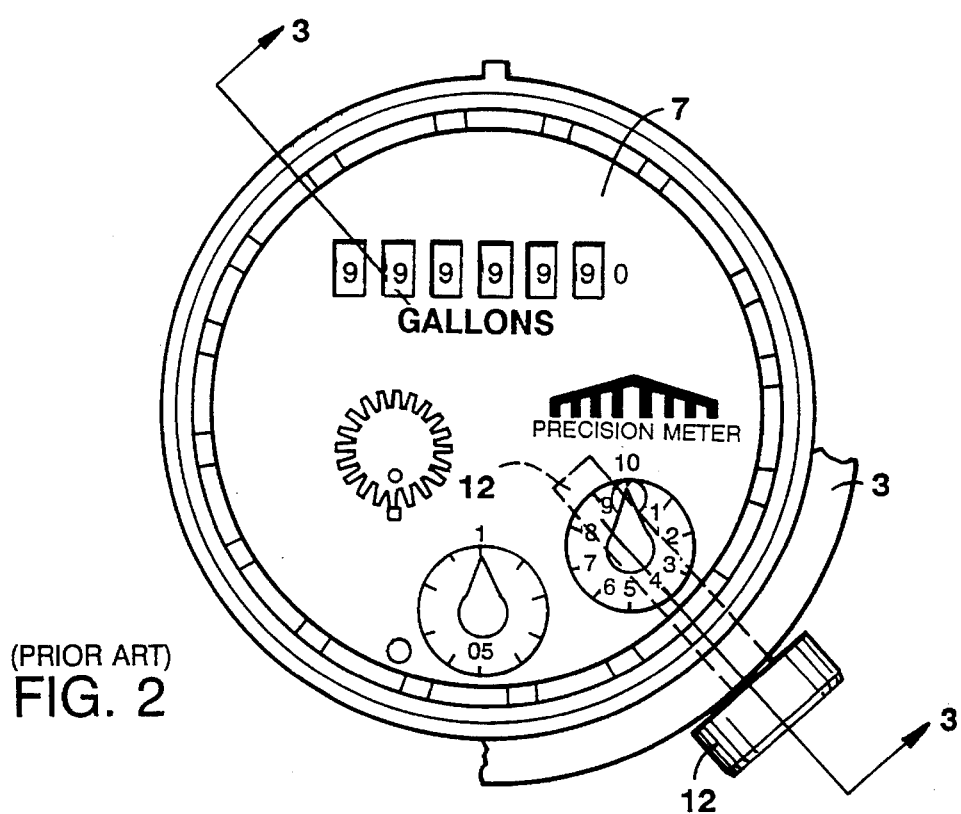
FIG. 2 is a combined pictorial-diagrammatic top view of a water meter retrofitted for remote pickup according to one prior art approach.
Figure 3:
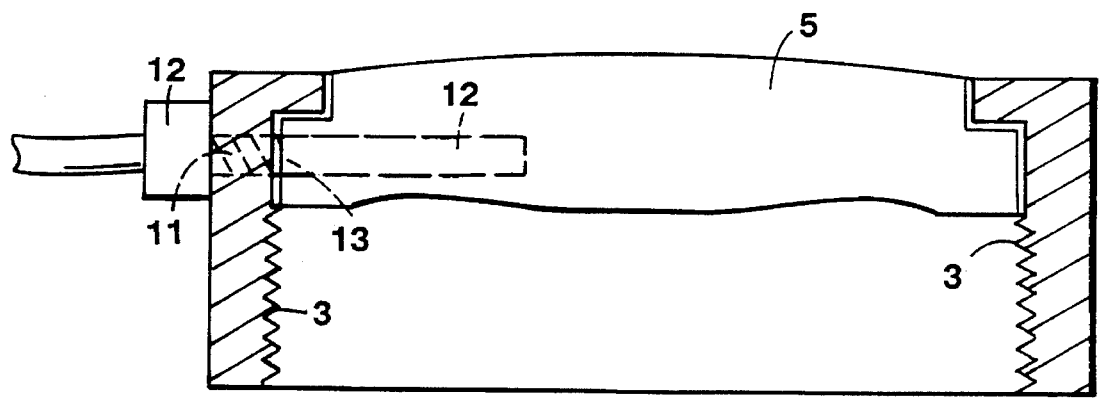
FIG. 3 is a diagrammatic side sectional view through section 3—3 of FIG. 2.
Figure 4:
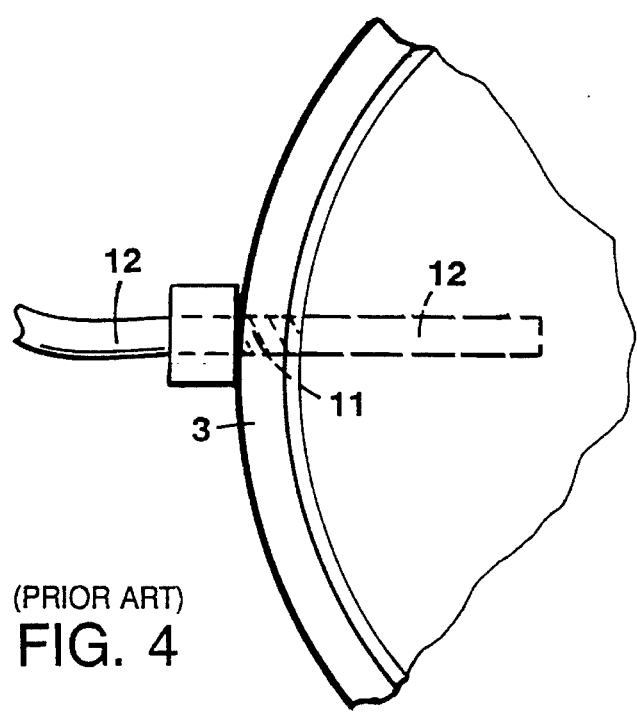
FIG. 4 is a diagrammatic fragmentary top view of the retrofitted water meter of FIG. 3.

FIGS. 2–4 show top, side-sectional and top fragmentary diagrammatic views of the relevant components of the water meter after the factory work and reassembly according to the second prior art approach. Remote-pickup transducer 12 attaches to the water meter through a hole 11 drilled in retaining ring 3 and another hole 13 drilled in lens 5.

Figure 5:
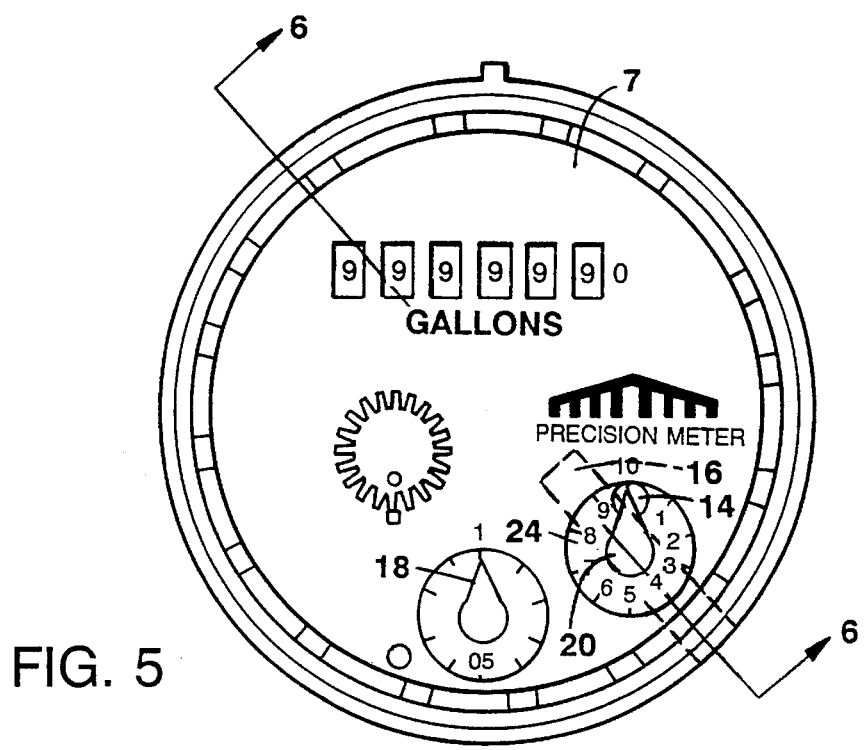
FIG. 5 is a combined pictorial-diagrammatic top view of a water meter retrofitted for remote pickup according to the invention.

Referring to FIG. 5, there is shown a combined pictorial-diagrammatic top view of a meter retrofitted for remote pickup according to the invention. Register 7 comprises a revolving tens pointer 20 and a revolving ones pointer 18. Although the invention may be used in conjunction with any such meter pointer, the description herein will describe the invention with respect to its use with tens pointer 20. Ones pointer 18 in FIG. 5 shows a meter pointer before retrofitting according to the invention. Tens pointer 20 shows a pointer after retrofitting according to the invention with signaller 14. Pointer 20 typically indicates on dial 24 water use in tens of gallons and revolves once per hundred gallons used. According to the invention, remote-pickup transducer 16 is typically a magnetic reed switch seated in replaceable lens 5' above pointer 20 clear of retaining ring 3. Remote-pickup transducer 16 provides a revolution signal each time signaller 14 passes pickup 16.

Figure 6:
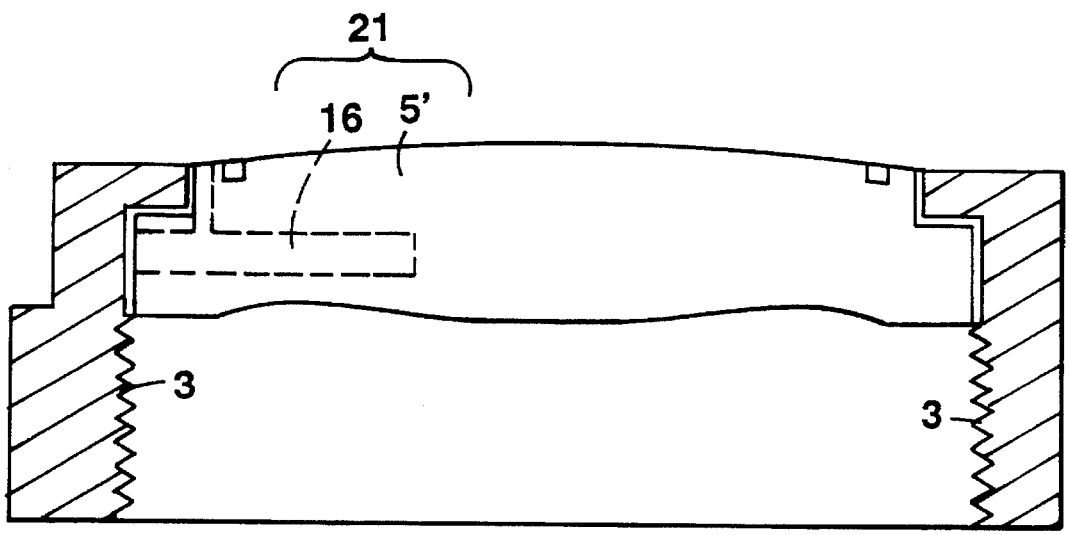
FIGS. 6 and 7 are diagrammatic side and top views of the retrofitted water meter of FIG. 5 according to the invention.

Referring to FIG. 6, there is shown a diagrammatic side-sectional view through section 6—6 of FIG. 5. Replaceable lens 5' is formed with a radial inside portion passage 16R for accommodating pickup 16 intersecting vertical end portion passage 16V near the lens perimeter for accommodating lead wires 16' from transducer 16, all free of retaining ring 3. Retaining ring 3 holds replaceable lens 5' in place with pickup 16 over pointer 20. Replaceable lens 5' may thus be described as having top and bottom surfaces with a circumferential edge between and formed with a passage having an opening in the top surface through which leads may pass and a portion between the top and bottom surfaces for accommodating the pickup to which the leads are connected.

Figure 7:
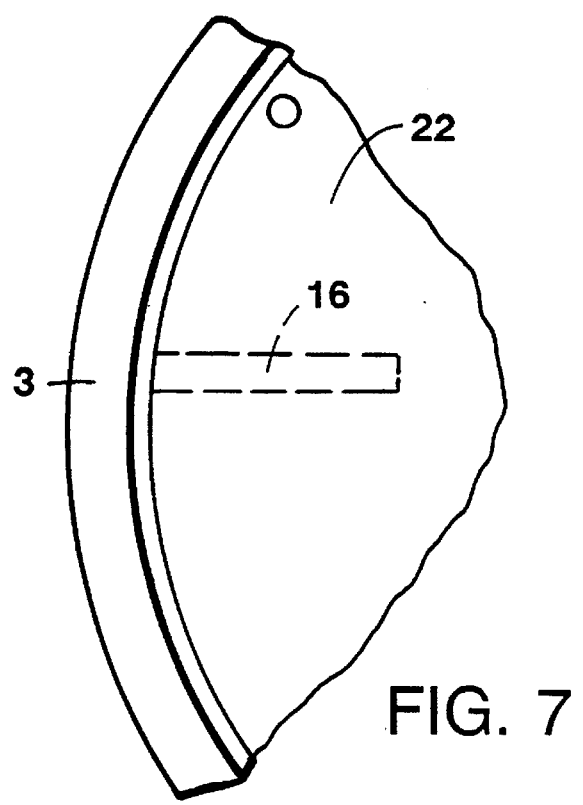

FIG. 7 shows a fragmentary top view of a meter retrofitted for remote pickup according to the invention with remote-pickup transducer 16 seated only in replacement lens 5', free of retaining ring 3.

Having described a retrofitted meter according to the invention, the assembly method will be described. The retrofitting method of the invention involves the replacement of only the original lens 5 with remote-pickup lens apparatus 21 shown in FIG. 6 having pickup 16. With reference now to FIG. 1, replacing the original lens 5 typically comprises removing lid 2, retaining ring 3, slip ring 4, and original lens 5. Referring now to FIG. 5, the method may further comprise attaching signaller 14, typically a permanent magnet, to pointer 20, typically with an adhesive. Replaceable lens assembly 5' is then positioned with pickup 16 overlying pointer 20. Then replace slip ring 4, the retaining ring 3, and the lid 1 while maintaining lens assembly 5' with pickup 16 overlying pointer 20 so that it provides a count signal for each revolution of pointer 20.

Typically one relatively unskilled person can perform the complete process within ten minutes at considerably less cost than prior art approaches.

Remote-pickup transducer 16 typically comprises a magnetic reed switch and signaller 14 comprises a permanent magnet. In another embodiment of the invention the remote-pickup transducer 16 comprises a light and a photodetector and signaller 14 comprises a reflector. In either embodiment, as pointer 20 revolves in response to flow, signaller 14 operates remote-pickup transducer 16 typically once per revolution to provide a count signal. As noted above, the number of revolutions of pointer 20 indicates the amount of flow. Therefore, flow may be determined remotely by counting the number of count signals.

The invention saves money and time over present practice because the retrofitting can be done in the field in about ten minutes by a relatively unskilled person and typically requires the replacement of only the original lens, a significant reduction in direct labor and material costs.

Other embodiments are within the claims.

For example, the invention embraces water meters, gas meters, electric power meters, and other meters having a lens overlying an indicator.

What is claimed is:

1. A method of retrofitting a meter for measuring flow in a flow path and having a casing for remote pickup for use with remote reading equipment, said meter comprising an original lens, said method comprising, replacing said original lens with a remote-pickup lens apparatus, said remote-pickup lens apparatus comprising, a replaceable meter lens, and a remote-pickup transducer seated only in said replaceable meter lens and free of said casing.

2. The method of claim 1 wherein, said meter comprises a flow indicator, and said method further comprising positioning said replaceable meter lens with said remote-pickup transducer located relative to said flow indicator to produce an output signal indicative of said flow.

3. The method of claim 2 wherein, said flow indicator comprises a revolving pointer, and said output signal is a count signal representing a count for each revolution of said pointer.

4. The method of claim 3 and further comprising attaching a signaller to said revolving pointer, whereby said remote-pickup transducer is responsive to said signaller for providing said count signal.

5. The method of claim 4 wherein, said signaller comprises a magnet, said remote-pickup transducer comprises a magnetic reed switch, and said magnetic reed switch operates in response to each pointer revolution to provide said count signal.

6. The method of claim 1 practiced while said meter remains connected to said flow path and measuring said flow.

7. A remote-pickup meter having a lens and casing comprising, a flow indicator, and a lens apparatus comprising a replaceable lens with a remote-pickup transducer seated only in the replaceable lens free of said casing, wherein said remote-pickup transducer is responsive to said flow indicator to produce an output signal indicative of said flow.

8. The remote-pickup meter of claim 7, wherein said flow indicator comprises a rotating pointer.

9. The remote-pickup meter of claim 8, wherein said flow indicator further comprises a signaller attached to said pointer, said remote-pickup transducer being responsive to said signaller to provide an output signal representative of the number of revolutions of said pointer.

10. The remote-pickup meter of claim 9, wherein said signaller comprises a permanent magnet, and said remote-pickup transducer comprises a magnetic reed switch.

11. Remote-pickup apparatus for a meter having a casing comprising, a replaceable lens attached to said casing and having top and bottom surfaces and a circumferential edge therebetween and formed with a passage having an inside portion between said top and bottom surfaces contiguous with an end portion generally perpendicular to said inside portion and said top and bottom surfaces for accommodating a pickup transducer and signal leads connected to said pickup transducer, and said pickup transducer seated in said inside portion of said passage having said signal leads passing through said end portion and said opening free of said casing.

12. The remote-pickup apparatus of claim 11, further comprising a remote-pickup signaller.

13. The remote-pickup apparatus of claim 12, wherein said remote-pickup transducer comprises a magnetic reed switch, and said remote-pickup signaller comprises a permanent magnet.

14. Apparatus for a meter with a lens and casing for remote reading comprising, a replaceable lens having top and bottom surfaces with a circumferential edge therebetween and formed with a passage having an inside portion between said top and bottom surfaces contiguous with an end portion generally perpendicular to said inside portion and said top and bottom surfaces with an opening in said top surface for accommodating a pickup transducer and signal leads connected to said pickup transducer, and said pickup transducer seated in said inside portion of said passage having said signal leads passing through said end portion and said opening.

* * * * *